S. N. DAVIDSON.
PANTS PRESSER.
APPLICATION FILED MAR. 24, 1913.

1,088,329.

Patented Feb. 24, 1914.

Witnesses
M. S. Watson
Frank L. Ratcliffe

Inventor
S. N. Davidson
By Chandler & Chandler
Attorneys

COLUMBIA PLANOGRAPH CO., WASHINGTON, D. C.

UNITED STATES PATENT OFFICE.

SIDNEY N. DAVIDSON, OF CHARLOTTE. NORTH CAROLINA.

PANTS-PRESSER.

1,088,329.　　　　　Specification of Letters Patent.　　Patented Feb. 24, 1914.

Application filed March 24, 1913. Serial No. 756,468.

*To all whom it may concern:*

Be it known that I, SIDNEY N. DAVIDSON, a citizen of the United States, residing at Charlotte, in the county of Mecklenburg, State of North Carolina, have invented certain new and useful Improvements in Pants-Pressers; and I do hereby declare the following to be a full, clear, and exact description of the invention, such as will enable others skilled in the art to which it appertains to make and use the same.

This invention relates to improvements in trousers creasing devices and has special reference to such devices of that class as are designed to occupy a minimum amount of space.

The object of this invention resides in the provision of a trousers creasing device wherein trousers may be disposed in a flattened position and pressed and creased.

A further object is to provide such a device which possesses the most simplicity consistent with efficient operation.

With these and other objects and advantages in view, the invention resides in the novel combination, formation and arrangement of parts to be more fully hereinafter described, and particularly pointed out in the claim hereto appended.

Figure 2:
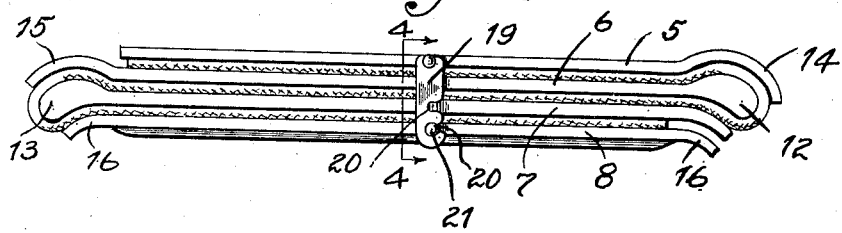
Figure 1:
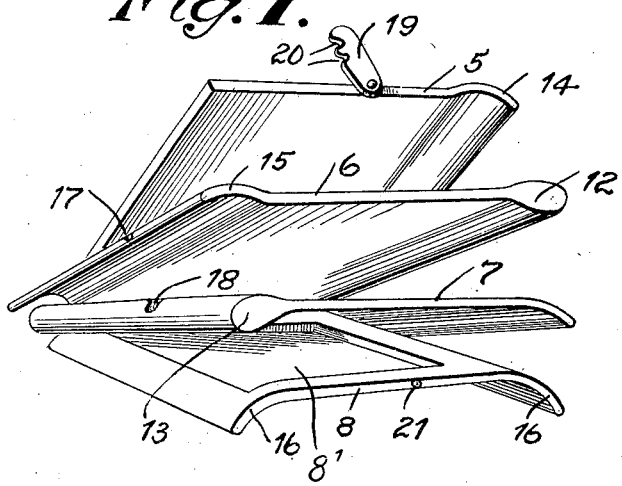
Figure 3:
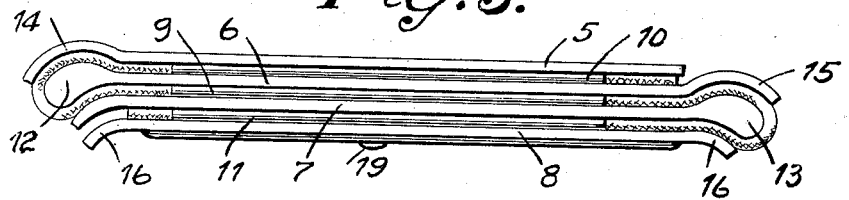
Figure 4:
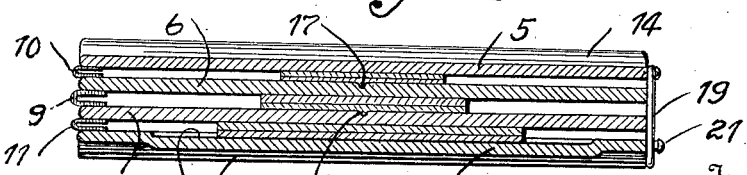

Reference is had to the accompanying drawings wherein similar characters of reference designate corresponding parts throughout the several views and in which:

Figure 1 is a perspective view of the improved device opened to receive a pair of trousers, Fig. 2 is a front edge view of the device closed and holding a pair of trousers, Fig. 3 is a rear edge view of the same, Fig. 4 is a sectional view on the line 4—4 of Fig. 2.

Referring more particularly to the drawings, the invention comprises a plurality of leaves 5, 6, 7, and 8 which are hinged together at adjacent side edges by means of the hinge 9 connecting the intermediate leaves 6 and 7 and the hinges 10 and 11 connecting the outer leaves 5 and 8 to the inner leaves 6 and 7 respectively. One end of the trousers is placed between the leaves 5 and 6 bent around one end 12 of the leaf 6 extended between the leaves 6 and 7 bent around the end 13 of the leaf 7 and terminating between the leaves 7 and 8.

In order that the trousers will have no objectionable transverse creases due to being bent around the end 12, the said end is enlarged and rounded so as not to present a sharp edge. The end 13 is also similarly enlarged and rounded. The end of the leaf 5 adjacent the end 12 of the leaf 6 is transversely bowed as at 14 to receive the enlarged end 12, the other end of the leaf 5 terminating short of the other end of the leaf 6. The end of the leaf 6 adjacent the end 13 of the leaf 7 is similarly bowed as at 15 for receiving said end 13. The ends of the leaf 8 are curved downwardly as at 16 to correspond with the curve of the end 13 and the curve of the other end of the leaf 7.

In order to provide a seat for the welt of the trousers the leaf 6 is provided on its upper face with a central longitudinally extending groove 17 and the leaf 7 is provided on its upper face with a similar groove 18. The leaf 8 is provided on its inner face with a suitable depression 8' for receiving extra width caused by the pockets and binding of the hip portions of the trousers. In order to lock the leaves in closed position and thus crease the trousers, the leaf 5 is provided on its outer edge with a latch member 19 pivoted thereto which is provided with a plurality of recesses 20 for selectively engaging a pin 21 carried by the outer edge of the leaf 8.

It will thus be seen that there has been provided a trousers creaser which will occupy a minimum amount of space while it is in operation and which is therefore adapted to crease trousers while they are being carried in transit.

What is claimed is:

A trousers presser and stretcher comprising a pair of intermediate leaves hinged together at adjacent side edges, a plurality of outer leaves hinged to the said intermediate leaves, opposed ends of the intermediate leaves being enlarged, said enlarged ends presenting a continuously curved trousers engaging surface and the adjacent ends of the leaves being curved to correspond with the curved surfaces of said enlarged ends and locking means attached to the free side edges of the outer leaves for holding the leaves in close relation.

In testimony whereof, I affix my signature, in the presence of two witnesses.

SIDNEY N. DAVIDSON.

Witnesses:
W. G. McLaughlin,
John M. Robinson.

Copies of this patent may be obtained for five cents each, by addressing the "Commissioner of Patents, Washington, D. C."